United States Patent [19]
Reams

[11] 3,804,222
[45] Apr. 16, 1974

[54] CLUTCH WITH CENTRIFUGAL ENGAGING AND RELEASING WEIGHTS

[75] Inventor: William H. Reams, Boonsboro, Md.

[73] Assignee: The United States of America as represented by the Secretary of the Navy, Washington, D.C.

[22] Filed: Mar. 16, 1972

[21] Appl. No.: 235,205

[52] U.S. Cl.... 192/103 B, 192/104 C, 192/105 CD, 192/83
[51] Int. Cl............................................. F16d 43/14
[58] Field of Search......... 192/103 B, 104 C, 104 B, 192/105 CD, 105 BB, 105 BA

[56] References Cited
UNITED STATES PATENTS

| | | | |
|---|---|---|---|
| 3,131,797 | 5/1964 | Bochan | 192/103 B |
| 3,308,912 | 3/1967 | Sheckells | 192/105 CD |
| 219,558 | 9/1879 | Worick | 192/104 C |
| 2,860,519 | 11/1958 | Cavanaugh | 192/104 C |
| 2,333,007 | 10/1943 | Heintz | 192/105 CD X |

Primary Examiner—Benjamin W. Wyche
Attorney, Agent, or Firm—R. S. Sciascia; J. A. Cooke; M. G. Raskin

[57] ABSTRACT

A centrifugal clutch for transmitting rotary motion from a first rotating shaft to a second rotatable member, only when the first rotating shaft has an angular speed of a value between predetermined upper and lower angular speeds, including a first circular plate fixed to the rotating shaft. A pair of spring biased members having shoulders formed on the outer edges thereof are pivoted to the circular plate and are adapted to move outwardly during rotation at a sufficient angular speed. The first circular plate is received by four arcuate shoes radially slidably mounted on a second circular plate and include inwardly extending projections formed thereon adapted to engage the shoulders. After rotational speed increases beyond a predetermined upper limit, the shoes move outwardly relative to the plate and disengage the clutch.

4 Claims, 9 Drawing Figures

3,804,222

CLUTCH WITH CENTRIFUGAL ENGAGING AND RELEASING WEIGHTS

BACKGROUND OF THE INVENTION

This invention relates generally to a clutch mechanism, and more particularly, to a speed discriminating clutch mechanism which will transmit rotary motion from a rotating shaft to a rotatable member only when the shaft rotates at an angular speed between predetermined upper and lower angular speeds.

In air-delivered ordnance vehicles, for safety purposes it is a common practice to maintain the firing system thereof in a "safe" or unarmed mode for a period of time subsequent to launch. A conventional method by which such vehicles are armed is through the rotation of an air vane on the nose of the vehicle which causes an explosive element which is normally out-of-line in an explosive train to move into an armed position thereby completing the explosive path. Problems have arisen, however, in the use of this type arrangement. For example, it has been frequently found that premature arming of the device occurs. More specifically, after launch of the ordnance vehicle, the explosive train is completed prior to the predetermined time for which this event was scheduled. Another problem which has occurred is that, upon the air vane reaching extremely high angular velocities, the explosive element is caused to "overshoot" its intended position and therefore render the weapon a dud.

SUMMARY OF THE INVENTION

Accordingly, one object of this invention is to provide a new and improved clutch mechanism.

Another object of the invention is the provision of a new and improved clutch mechanism having a predetermined lower angular velocity limit below which the clutch is maintained in a disengaged configuration.

Still another object of the present invention is to provide a new and improved clutch mechanism adapted to attain a disengaged configuration at angular velocities above a predetermined upper angular velocity limit.

A further object of the instant invention is to provide a new and improved clutch mechanism which will be in an engaged configuration when the angular velocity is in between two predetermined values.

A still further object of this invention is the provision of a new and improved clutch mechanism for transferring rotational motion from an air vane to an explosive train.

Another still further object of the instant invention is to provide a simple and easy-to-manufacture clutch mechanism which has a speed discriminating feature.

Briefly, in accordance with one embodiment of this invention, these and other objects are attained by providing a shaft connected to an air vane at the nose of an ordnance vehicle. A pair of pivotally mounted members are coupled at the end of the rotating shaft and are adapted to move outwardly during rotation at a speed greater than a predetermined angular speed. The members rotate within arcuate shoes which provide inwardly extending projections such that, upon the pivoting of the members mentioned hereinabove, this apparatus becomes engaged thereto. During rotation at a speed greater than an upper predetermined angular velocity, the arcuate shoes move outwardly and disengage the clutch.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 2:
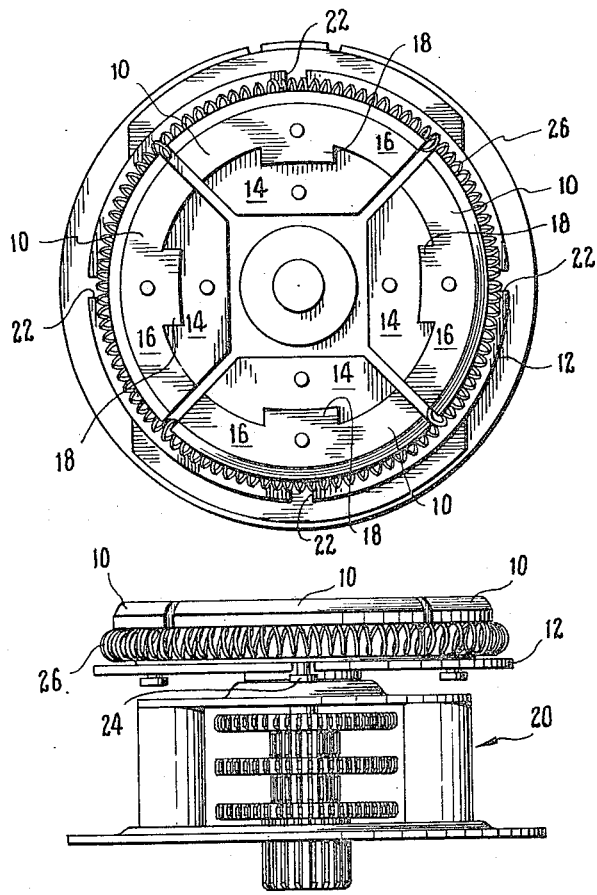
FIG. 2 is a plan view of the apparatus illustrated in FIG. 1.
Figure 1:
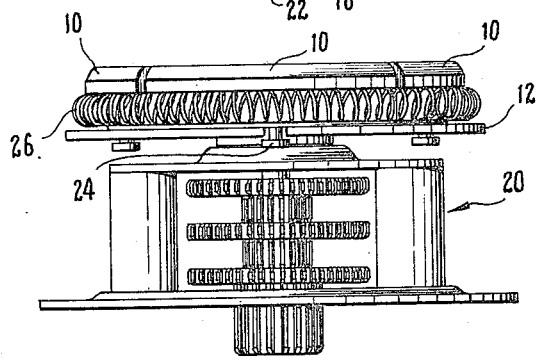
FIG. 1 is a side view of the spring biased arcuate shoes and accompanying gear arrangement of the present invention.

Referring now to the drawings wherein like reference characters designate identical or corresponding parts throughout the several views, and more particularly to FIGS. 1 and 2 thereof, four arcuate shoes 10 are shown slidably coupled to a circular plate 12 as will be described in greater detail hereinafter. Each shoe 10 includes a planar portion 14 and an arcuate lip 16 formed on the outer edge thereof. The concave surface of the arcuate lip 16 of each arcuate shoe 10 has an inwardly extending projection 18 formed thereon.

The circular plate 12 is rotatably mounted on a shaft directly coupled to a gear or escapement arrangement 20 of a conventional type. The plate 12 has four equally spaced radial slots 22 formed therein. Each arcuate shoe 10 has two lugs 24 projecting from the lower surface thereof which are adapted to be slidably positioned within each slot 22. Therefore, each arcuate shoe 10 is radially slidable on circular plate 12. The arrangement of shoes is held in a configuration wherein each shoe is as close as possible to the center of plate 12 by an elongate spring 26 which circumferentially extends along the outer surface of arcuate lip 16 thereby urging each shoe to its most inward position. It can be seen that, when the shoes 10 are rotated by an external rotational force, the circular plate 12 is caused to rotate under the action of lugs 24, and thereby actuate the escapement mechanism 20.

Figure 4A:
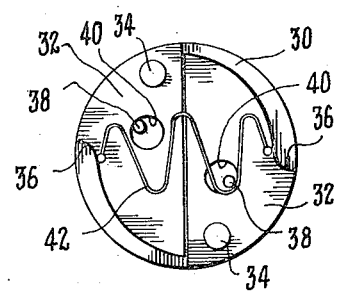
FIGS. 4a and 4b are views taken along lines 4—4 of FIG. 3.
Figure 4B:
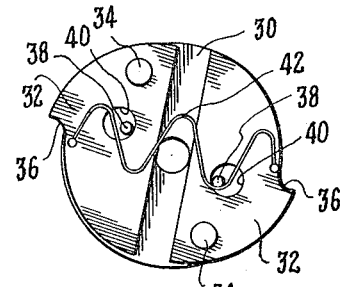
Figure 3A:
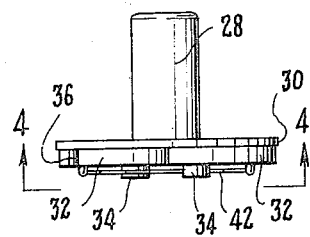
FIGS. 3a and 3b are side views of the first circular plate and spring biased pivotal members in their extended configuration.
Figure 3B:
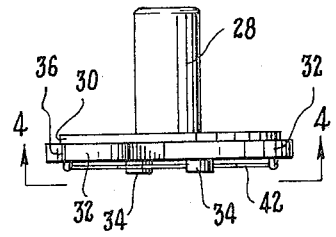

Referring now to FIGS. 3 and 4, the other half of the clutch mechanism is shown as including a shaft 28 having a thin circular plate 30 fixed centrally thereto at one end. On the surface of plate 30 opposite the surface on which shaft 28 is connected, a pair of substantially crescent shaped members 32 are pivotally mounted at diagonally opposed pivot points 34. Each member 32 has an outer portion cut therefrom so as to form a shoulder 36. Further, plate 30 has provided thereon a pair of small rods 38 which extend through openings 40 formed in each member 32. A spring 42 has its ends mutually connected to each member 32 by conventional means and normally urges them together in a manner whereby shoulders 36 overlie plate 30 and do not extend over the edge thereof.

Figure 6A:
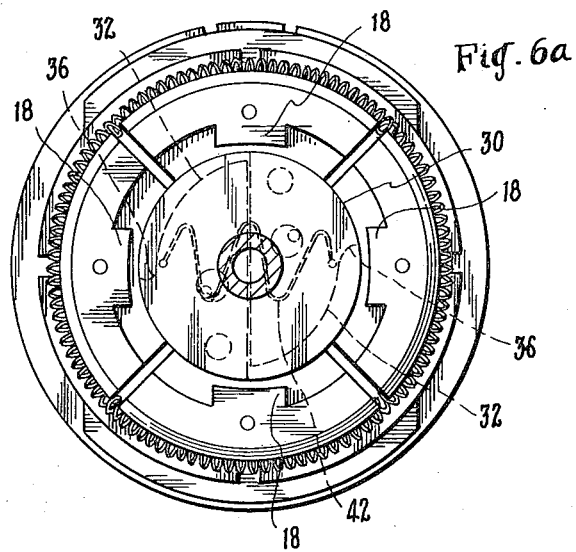
FIGS. 6a and 6b are views taken along lines 6—6 of FIG. 5 when the pivotal members are in their unextended and extended configurations respectively.
Figure 6B:
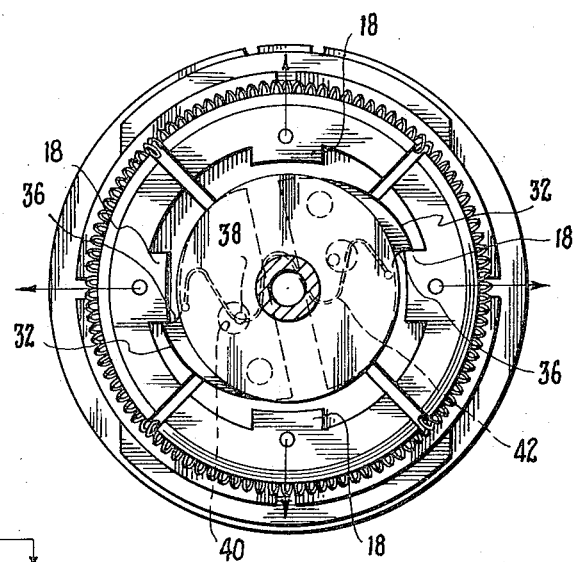
Figure 5:
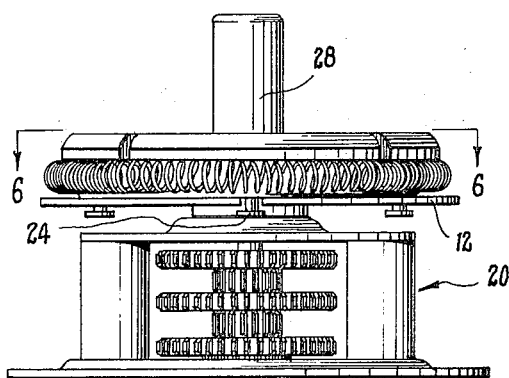
FIG. 5 is a side view of the clutch mechanism in its assembled form schematically showing a connection to an explosive element of an explosive train.
Figure 5:
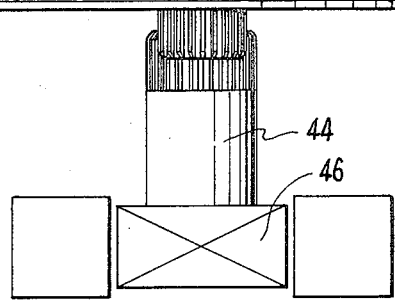

Referring now to FIGS. 5 and 6, upon assembly of the clutch mechanism, the plate 30 and attached members 32 are positioned within the area whose outer boundary is defined by the four arcuate lips 16 with the shoulders 36 coplanar with the inwardly extending projections 18. In operation, the circular plate 30 is caused to rotate due to the rotation of shaft 28. The shaft 28 may be connected to an air vane positioned at the nose of an air-delivered ordnance vehicle. As shaft 28 and plate 30 begin to slowly rotate, spring 42 is still able to overcome the centrifugal force on crescent shaped members 32 so as to retain these members in the configuration shown in FIG. 6a. At this point, there is no engagement between the arcuate shoes 10 and shoulders 36 and, therefore, there is no transmission of the rotation of shaft 28 to the gearing arrangement 20. As shaft 28 increases in rotational speed due to the increase in speed of the ordnance vehicle, the centrifugal force acting on members 32 increases, thereby causing the members to move outwardly. The extent of outward movement is limited by the interference of rods 38 and openings 40. When a predetermined minimum rotational speed is attained, the members 32 attain a configuration wherein shoulders 36 extend over the perimeter of plate 30 as shown in FIG. 6b. As rotation continues, shoulders 36 contact the edge of inwardly extending projections 18. As this occurs, plate 12 is caused to rotate through the connection of lugs 24 thereby transmitting rotary motion through the escapement mechanism 20 and to a rotatable member 44 (FIG. 5). This rotatable member 44 may be coupled to an explosive element comprising an element of an explosive train. The rotation of this explosive element 46 is from an out-of-line "safe" position to an in-line "armed" position. As the rotational speed of shaft 28 increases with the consequent increase in rotational speed of the arcuate shoe arrangement, the increasing centrifugal force on the arcuate shoes 10 cause these members to move outwardly on plate 12 (in the direction of the arrows in FIG. 6b) in slots 22 against the force of spring 26. When a specified predetermined upper rotational speed is attained, the inwardly extending projections 18 have moved a sufficient distance to disengage from the shoulders 36 of the crescent shaped members.

By varying the dimensions and weights of the arcuate shoes 10 and crescent shaped members 32, the predetermined upper and lower rotational speed may be varied in accordance with the applications for which the mechanism is to be used.

Obviously, numerous modifications and variations of the present invention are possible in the light of the above teachings. It is therefore to be understood that within the scope of the appended claims, the invention may be practised otherwise than as specifically described herein.

What is claimed as new and desired to be secured by Letters Patent of the United States is:

1. A centrifugal clutch for transmitting rotary motion from a first rotating shaft to a second rotatable member only when said first rotating shift has an angular speed of a value between predetermined upper and lower angular speeds comprising:

a first circular plate fixed to said first rotating shaft and perpendicularly disposed thereto;

first means including at least one pivotally mounted, spring-biased member having a shoulder formed on the outer edge thereof, said shoulder normally overlying said first circular plate and extendable beyond the perimeter of said first plate only after said first plate is rotated at said predetermined lower angular speed;

a second plate coupled to said second member; and second means, receivable of said first circular plate and first means, including at least one arcuate shoe having an inwardly extending projection formed thereon, slidably coupled to said second plate for moving outwardly thereon only after said second plate is rotated at said predetermined upper angular velocity.

2. A centrifugal clutch as recited in claim 1 wherein said first plate is rotatably mounted on said second plate and said first means and said second means are adapted so that said shoulder contacts said inwardly extending projection when said first plate is rotating at a speed greater than said predetermined lower speed and disengages when said second plate rotates at a speed greater than said predetermined upper speed.

3. A centrifugal clutch as recited in claim 2 wherein: said first means includes two members having a wire spring mutually connecting said members and means for limiting the pivotal movement thereof.

4. A centrifugal clutch as recited in claim 3 wherein: said second means includes four arcuate shoes, each shoe slidable in radial slots formed in said second plate and a spring circumferentially extending around said shoes.

* * * * *